United States Patent [19]

Devore

[11] 4,281,641
[45] Aug. 4, 1981

[54] SOLAR ENERGY COLLECTING SYSTEM

[75] Inventor: Clyde W. Devore, Northampton, Mass.

[73] Assignee: Heliotropin Engineering Corp., Holyoke, Mass.

[21] Appl. No.: 902

[22] Filed: Jan. 4, 1979

[51] Int. Cl.³ .............................................. F24J 3/02
[52] U.S. Cl. ................................. 126/438; 126/446; 126/425; 126/417; 126/449
[58] Field of Search ............... 126/438, 439, 451, 443, 126/449, 424, 425, 446, 417; 353/3; 350/289, 293

[56] References Cited

U.S. PATENT DOCUMENTS

| Re. 30,027 | 6/1979 | Hockman | 126/438 X |
|---|---|---|---|
| 503,004 | 8/1893 | Severy | 126/438 |
| 1,162,505 | 11/1915 | Nichols | 126/438 |
| 1,345,758 | 7/1920 | Folsom | 126/438 X |
| 3,974,824 | 8/1976 | Smith | 126/446 X |
| 4,003,366 | 1/1977 | Lightfoot | 126/438 |
| 4,011,855 | 3/1977 | Eshelman | 126/438 |
| 4,026,273 | 5/1977 | Parker | 126/438 |
| 4,077,392 | 3/1978 | Garner | 126/438 |
| 4,180,055 | 12/1979 | Hudnall | 126/446 |

Primary Examiner—Larry Jones
Attorney, Agent, or Firm—Chapin, Neal & Dempsey

[57] ABSTRACT

A solar energy collecting system comprising a reflective collector including a pair of parabolic portions which focus solar energy on to a pair of spaced focal lines coincident with the sidewalls of a heat exchange tube. The heat exchange tube is transparent to the solar energy and includes interiorly thereof an arrangement of fins which provide for an enhanced absorbtion of solar energy focused thereon and conduct solar heat to a heat exchange fluid within the tube.

9 Claims, 6 Drawing Figures

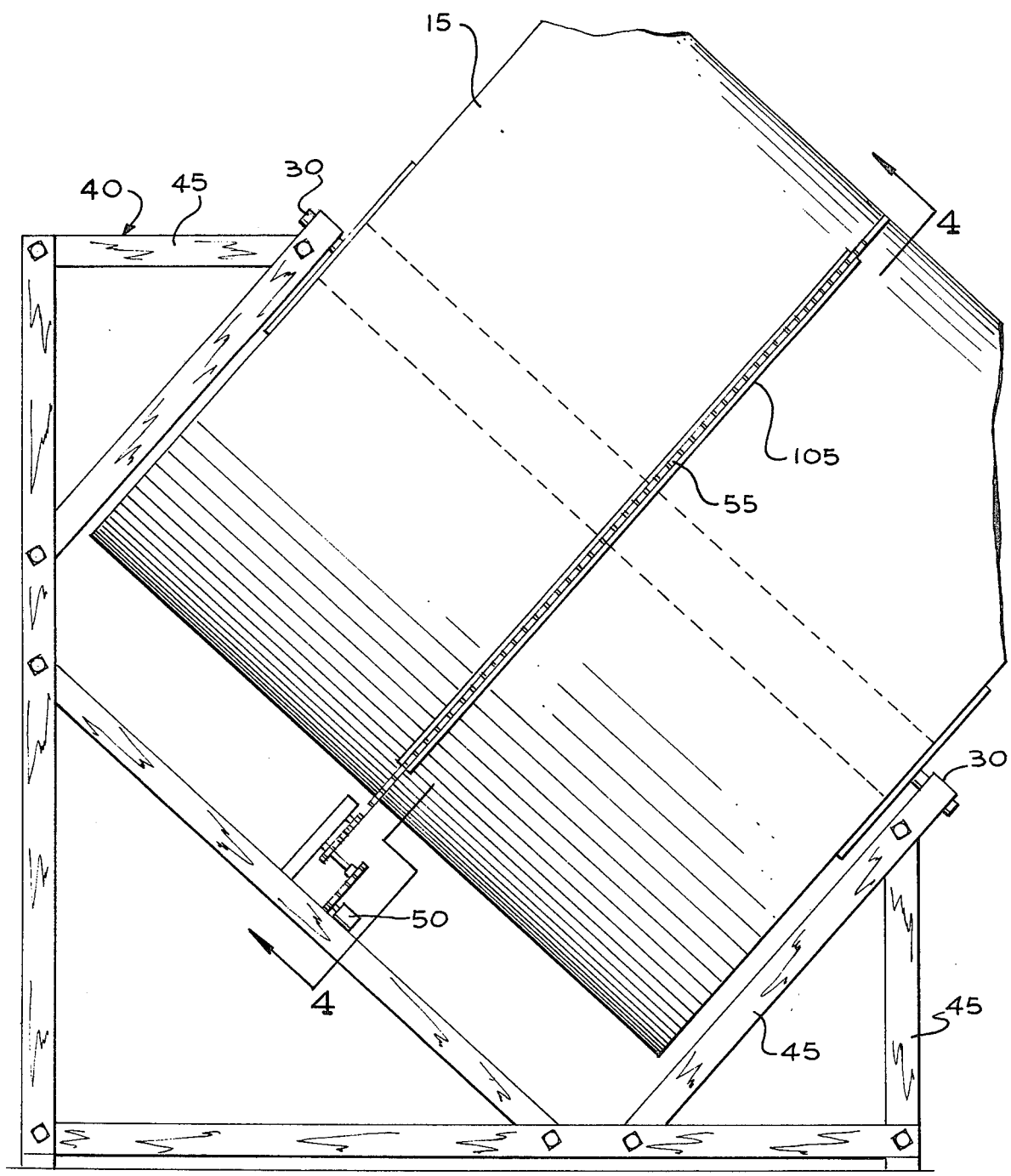
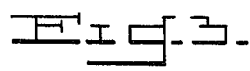

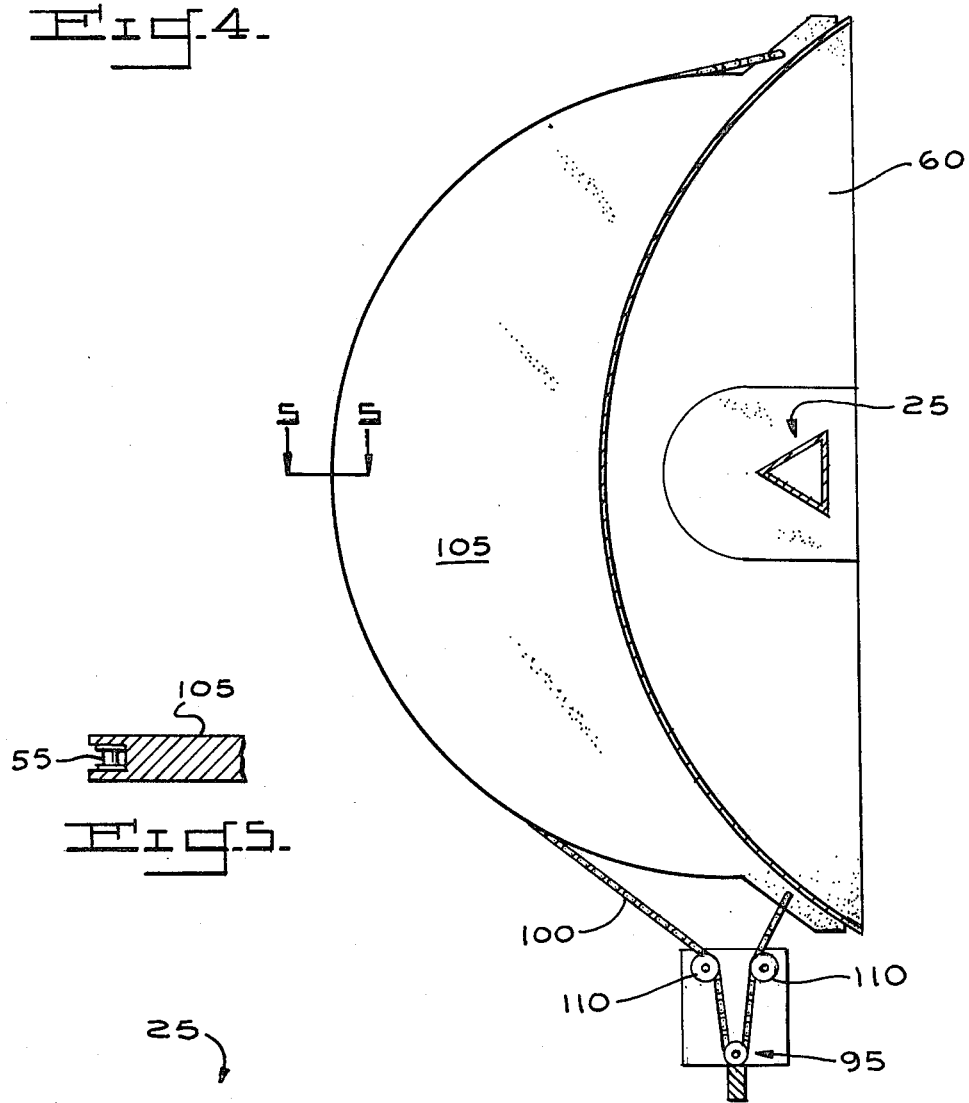
Fig. 4.
Fig. 5.
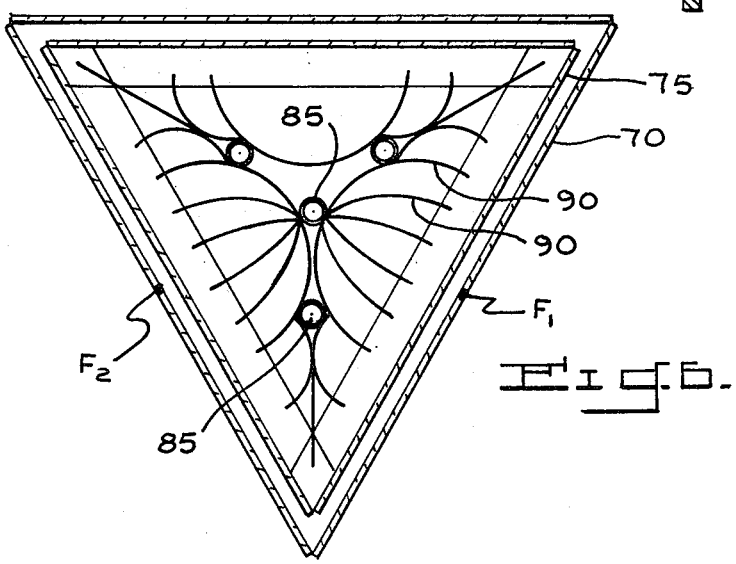
Fig. 6.

SOLAR ENERGY COLLECTING SYSTEM

BACKGROUND

This invention relates to solar energy collecting systems and particularly to such systems wherein sunlight is gathered by a reflective collector and focused onto a container or conduit of heat exchange fluid.

Prior art solar energy collecting systems often employ reflective or mirrored collectors which gather sunlight and focus the sunlight on a conduit which accommodates a heat exchange fluid, the flow of which carries heat to the location where it is to be utilized. To optimize the amount of sunlight gathered, the collector is usually quite long and broad and the heat transfer fluid flow through the collector is usually confined to a narrow conduit.

The reflective collector is often of a single parabolic cross sectional curvature which in theory gathers parallel rays of sunlight and focuses the sunlight on to a line, a narrow elongated heat transfer fluid conduit being located coincident to this theoretical focal line. While much of this sunlight may indeed be focused onto this line thereby raising the temperature of the heat transfer fluid, it will be understood that unless the collector is of precise parabolic shape, substantial quantities of the reflected sunlight may be found on points spaced from the heat transfer fluid conduit thereby limiting the overall efficiency of the collector system. While forming the collector in such a precise parabolic shape would maximize the amount of radiation focused on the focal line, such precision construction may be economically prohibitive for many applications.

Accordingly, it is a principal object of the present invention to provide a solar energy collecting system which overcomes the deficiencies of the prior art.

It is another object of the present invention to provide such a solar energy collecting system of enhanced efficiency.

It is another object of the present invention to provide such a solar energy collecting system which is economical to manufacture.

DESCRIPTION OF THE DRAWINGS

These and other objects will become more readily apparent from the following detailed description taken in connection with the appended claims and accompanying drawings wherein:

FIG. 3 is an elevated view of the system illustrating a drive apparatus employed therewith;

FIG. 4 is a sectional view of a reflective collector and the drive apparatus therefor taken along line 4—4 of FIG. 3;

FIG. 5 is a sectional view taken along line 5—5 of FIG. 4; and

FIG. 6 is an end view of an alternate embodiment of the heat exchanger shown in FIG. 2.

DESCRIPTION OF THE PREFERRED EMBODIMENT

Figure 1:
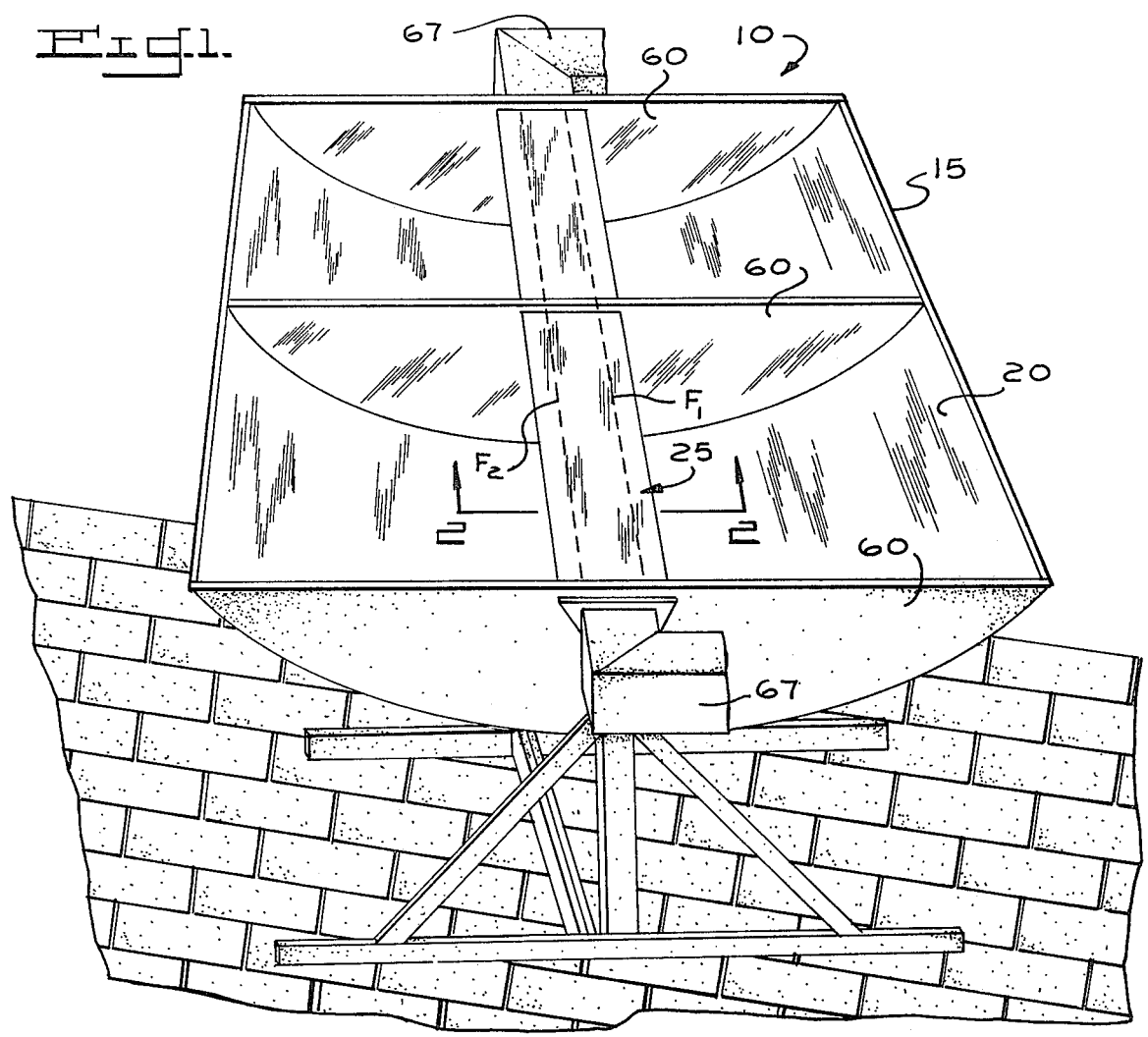
FIG. 1 is a perspective view of the solar energy collecting system of the present invention.

Referring to the drawings, the solar energy collection system of the present invention is shown generally at 10 and comprises a collector 15 having a light reflecting surface 20 and a heat exchanger 25 fixed thereto at the center thereof. The reflective collector and conduit are adapted to track the sun during daylight hours and to this end are pivotally supported as by bearings 30 on a supporting frame 40 formed generally from a plurality of struts or beams 45. The apparatus is powered for such tracking by any known means such as electric motor 50 driving a chain 55 connected at the ends thereof to the collector.

Referring in general to FIGS. 1 and 4, the reflective collector comprises a curved wall formed from any suitable material such as wood, metal, synthetic plastic or the like. For support of the wall and, to maintain the shape of the wall the collector may be provided with a plurality of stiffening ribs 60. The reflective surface 20 is provided on the inner or concave surface of the collector and is formed from any material of suitable light reflecting properties. Where the wall is formed from a material such as certain metals, wood or certain plastics which are not suitably reflective the surface may be formed by bonding or coating a reflective layer of material such as metallic foil or aluminized polyester film such as that sold under the trademark "MYLAR" to the concave wall surface.

The shape of the reflective collector is compound parabolic, that is, the concave collector wall is formed from a pair of parabolic portions which meet generally at the mid-portion of the wall. Being parabolic, each portion will focus sunlight incident thereon, generally along a straight focal line defined by a longitudinal extension of the focal point of a parabolic cross section of one of the wall portions. In accordance with the present invention, the parabolic portions are of such curvature and spacing that they have associated therewith a pair of spaced focal lines F1 and F2 coincident with two of the heat exchange walls. Accordingly, it will be understood that theoretically, all light in parallel rays incident on surface 20 will be gathered and focused on lines F1 and F2. However, inasmuch as all light rays incident on surface 20 may not be parallel due to the gathering by the collector of scattered sunlight, and the curvature of the collector wall may deviate from being precisely parabolic, due to either manufacturing techniques or wall distortion from exposure to the elements, substantial amounts of light may be focused by surface 20 on to points located off the focal lines.

Figure 2:
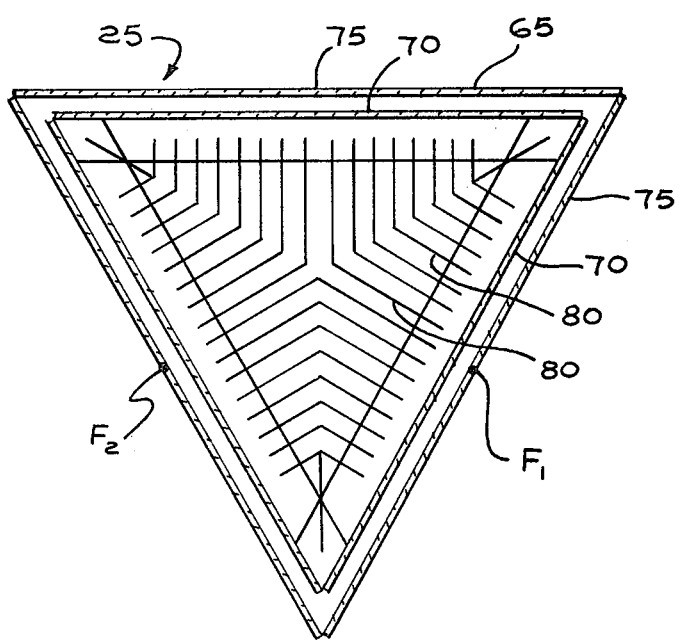
FIG. 2 is an end view of a heat exchanger employed in the system.

To utilize the solar energy which would otherwise miss the focal lines and be wasted, thus detracting from the efficiency of the apparatus, the present invention employs a novel heat exchanger shown at 25. Referring to FIG. 2 the heat exchanger comprises an elongated transparent tube 65 adapted to accommodate a flow of air as a heat transfer fluid therethrough, connections being made to tube 65 by means of duct work 67. In accordance with the present invention, tube 65 is supported on ribs 60 and positioned so that focal lines F1 and F2 are coincident with two of the sidewalls of the tube, generally at the mid-portions thereof. For evenness of fin heating, the reflective collector may be shaped so as to focus the sunlight onto a plurality of spaced focal lines generally coincident with the mid-portions of the heat exchanger walls. As shown each tube sidewall is formed from a pair of spaced panels 70 and 75 transparent to solar radiation, the space between the panels comprising either a gas space or a partial vacuum for insulating the flow of heat transfer fluid within the tube from the atmosphere.

Tube 65 is provided interiorly and along the length thereof with a plurality of spaced nested fins 80 which absorb heat from the sunlight focused thereon and conduct the heat to the heat transfer fluid, in this case air, flowing through the tube. Thus, it will be understood that the fins are formed from a material of high absorptivity, and low emissivity. In the preferred embodiment, the fins are formed from galvanized steel but other more suitable materials may be used. As illustrated fins 80 are generally V-shaped in cross section, extending generally normal to the tube sidewalls. The spacing between the fins both provide channels for the air flow through the tube and allows radiation reflected from the major surfaces of the fins, due to their inherent reflectivity, to strike and be partially absorbed by the major surface of an adjacent fin. Thus, it will be appreciated that inasmuch as a portion of reflected radiation is absorbed by a fin each time it impinges thereon, radiation repeatedly reflected between fins will be substantially completely absorbed by the fins for heating of the heat exchange fluid. Moreover, the distribution of the fins along the width of the tube sidewalls enables radiation focused by surface 20 on points displaced from the focal lines to be effectively employed to heat the airflow through tube 65 by impingement on the fins.

Referring to FIG. 6, heat exchanger 25 is shown adapted for use with a liquid heat transfer fluid such as, for example, water, the flow of which is accommodated within tubes 85 formed from a thermally conducting, solar energy absorbing, preferably non-corrosible metal of high thermal conductivity such as copper. Tubes 85 are disposed coincidentally with the lines of intersection of fins 90 which extend along the length of the transparent tube from locations adjacent the tube sidewalls generally normal thereto. These fins, generally curvilinear in cross section perform as fins 70 in providing an expansive target for solar radiation focused by surface 20 and by providing surfaces between which solar radiation may be repeatedly reflected and absorbed for the substantially complete overall absorption thereof by the fins.

The transparent tubes employed in the heat exchangers are shown as being generally of equilateral triangular cross section, whereby solar radiation is focused on the heat exchanger walls generally normal thereto for enhanced transmission therethrough. However, other tube cross sectional configurations may be employed without departing from this invention.

For purposes of tracking the sun during the daylight hours, the reflecting collector and heat exchanger are pivotally driven on bearings 30 by electric motor 50, the output shaft of which is connected to a drive sprocket 95. Sprocket 95 operatively engages flexible track or chain 100 connected at the ends thereof to the reflective collector and supported by a rib 105 having a generally circular outer chain supporting edge. Idler sprockets or rollers such as those shown at 110 may be provided as needed. It will be observed that as motor 30 rotates sprocket 95 drawing chain 100, the collector and heat exchanger will pivot on bearings 30 to track the sun. It will, of course, be appreciated that motor 30 may either continuously drive the collector or periodically adjust the position of the reflector to track the sun.

The motor and sprockets are mounted on one of the base struts in any convenient manner. The base itself may comprise any suitable supporting structure adapted to the surface on which the system is to be supported and capable of maintaining the collector at the proper inclination.

Having thus described the invention, what is claimed is:

1. A solar energy collecting system comprising:
    (a) a reflective collector having a pair of substantially parabolic sections that are adapted to gather solar radiation and focus said radiation generally along a pair of focal lines;
    (b) a heat exchanger having a tube adapted for containment of a heat exchange fluid therein, said tube being triangular in cross section and substantially transmissive to said solar radiation and including a plurality of sidewalls, wherein each of said focal lines is coincident with one of said sidewalls;
    (c) a plurality of spaced solar radiation absorbing and thermally conducting fins within the interior of said tube, said fins being adapted to be heated by said solar radiation to conduct heat to said heat exchanging fluid, said fins extending from locations adjacent said tube sidewalls generally normal thereto, pairs of adjacent fins defining gaps which converge to lines of intersection of adjacent fins, and said fins having opposed surfaces between which solar radiation is repeatedly reflected; and
    (d) at least one tube within the interior of said heat exchanger, said tube being formed from a heat conducting material, said tube disposed in contact with said lines of fin intersection and adapted to accommodate a flow of a liquid heat exchange fluid therewithin.

2. Solar energy collecting system according to claim 1 wherein said fins are generally V-shaped in cross section, the legs of each fin being disposed generally normal to the tube sidewalls.

3. Solar energy collecting system according to claim 1 wherein each sidewall of said heat exchanger tube is formed from a pair of spaced planar wall members, said wall members adapted to accommodate air therebetween for insulation of the interior of said tube from the atmosphere.

4. The solar energy collecting system according to claim 1 wherein said fins are curvilinear in cross section.

5. Solar energy collecting system according to claim 1 wherein said reflective collector and said transparent tube are adapted to pivot about an axis longitudinal thereto for tracking a source of radiant energy, said solar energy collecting system further including means for pivoting said reflective collector and said transparent tube, said pivoting means comprising a flexible track fastened at the ends thereof, opposed edges of said reflective collector and drive means operatively connected to said flexible track and adapted to draw said flexible track in opposite directions and pivot said reflective collector and transparent tube about said pivot axes.

6. The solar energy collecting system according to claim 5 wherein said flexible track comprises a chain and said drive means comprises a stationary motor operatively connected to a sprocket which continuously engages said chain, said chain being spaced from said reflective collector by a rib having a generally circular outer chain supporting edge.

7. A solar energy collecting system comprising:
    (a) a reflective collector having a pair of substantially parabolic sections that are adapted to gather solar radiation and focus said radiation generally along a pair of focal lines;

(b) a heat exchanger having an outer tube adapted for containment of heat exchange fluid therein, said tube being substantially transmissive to said solar radiation and including a plurality of sidewalls, wherein each of said focal lines is coincident with one of said sidewalls;

(c) a plurality of spaced sets of curvilinear fins within the interior of said outer tube, at least some of said sets including a plurality of fins that are tangential to one another at a common point; and (d) a plurality of inner tubes within the interior of said outer tube and adapted to accommodate a flow of said heat exchange fluid therewithin, at least some of said inner tubes being nested between and tangential to one of said spaced sets of fins, whereby said spaced sets are interconnected by said tangential inner tubes.

8. The solar energy collecting system of claim 7 wherein said outer tube is triangular in cross section, said cross section being an equilateral triangle.

9. The solar energy collecting system of claim 8 wherein said system includes means for pivoting said reflective collector and said tubes for tracking a source of radiant energy.

* * * * *